W. H. MIDGLEY,

Assignor to the JULIUS J. WOOD STARCH COMPANY.

LAUNDRY STARCH.

No. 10,722. Reissued May 11, 1886.

WITNESSES:

J. Thorden Bell

F. M. Clarke

INVENTOR,

William H. Midgley

BY George H. Christy

ATTORNEY

UNITED STATES PATENT OFFICE.

WILLIAM H. MIDGLEY, OF PITTSBURG, PENNSYLVANIA, ASSIGNOR TO THE JULIUS J. WOOD STARCH COMPANY, OF COLUMBUS, OHIO.

LAUNDRY-STARCH.

SPECIFICATION forming part of Reissued Letters Patent No. 10,722, dated May 11, 1886.

Original No. 319,598, dated June 9, 1885. Application for reissue filed July 16, 1885. Serial No. 171,803.

*To all whom it may concern:*

Be it known that I, WILLIAM H. MIDGLEY, of Pittsburg, in the county of Allegheny and State of Pennsylvania, have invented a new and useful Improvement in Laundry-Starch, of which improvement the following is a specification.

In the operation of ironing clothes after washing and starching them the great desire of the launderer or laundress is to give the clothes a newness of appearance and a smooth and glossy finish.

My invention has for its object the providing of a means whereby the launderer or laundress may with facility prepare the starch for the purpose of starching the clothes, so that not only will newness of appearance and a smooth and glossy finish be given to them after the operation of ironing, but also a surface to which dust and smutty matter will not readily adhere nor penetrate, and which will, when soiled, be easily cleaned by the washing process.

My invention consists of a glazing composition of matter, consisting of spermaceti, rice-flour, gum-arabic, paraffine, stearine, and extract of slippery-elm, formed into a homogeneous plastic mass, which is molded into the desired form for mixing with the starch for the starching of clothes, and in the combination of a cake of glazing composition with a box or package of starch, as will hereinafter more fully and at large appear.

To enable others skilled in the art with which my invention is most nearly connected to make and use my invention, I will proceed to describe the manner of making and using it.

Figure 2:
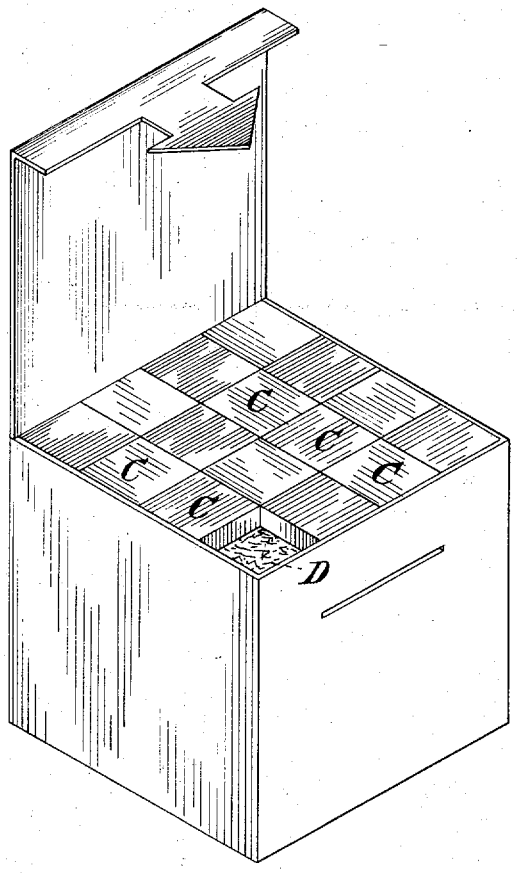
Figure 1:
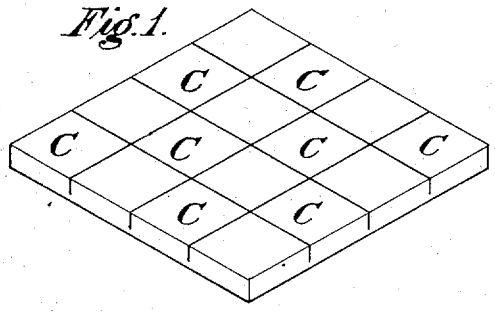

In the accompanying drawings, Figure 1 is a perspective view of a cake formed of my improved compound for mixing with starch. Fig. 2 represents a perspective view of a package containing starch, and a cake of compound for mixing with the starch.

In making my compound I use spermaceti, paraffine, rice-flour, stearine, gum-arabic, and extract of slippery-elm, and thoroughly mix them together, which is then molded into cakes of the form indicated in Fig. 1, with indentations, (shown at A B,) thereby forming sections C, which may be broken off, as indicated at D in Fig. 2, for mixing into and through the starch while preparing it for the starching of the clothes, which preparation of the starch is well understood by the launderer and laundress, and therefore need not be herein described. By dissolving one of the sections C in the fluid and heated starch and thoroughly mixing it therewith prior to starching the clothes, the starched parts of the clothes will have a newness of appearance, be smooth and glossy after being subjected to the ironing process, and the smooth and glossy surface will be of such character that dust and smutty matter will not penetrate it nor adhere to it. Therefore said surface will remain clean for a long time, and when soiled will be easily washed.

The cake shown in Fig. 1 is intended as an accompaniment with the starch in each package of starch, as shown in Fig. 2. By this combination of a cake of glazing compound with the starch in each package increased value will be given to said package of starch, and at the same time there will be a very convenient combination that will result in saving time and labor in laundry-work.

The glazing compound for starch may be made in other form or forms than that shown in Fig. 1 and placed in the package of starch. Therefore I do not confine myself to any one form, shape, or composition of a glazing compound for the purpose of being placed in the package with the starch.

The essentials of my invention consist in the above-described glazing compound, and in the combination of a glazing compound with the starch in boxes or packages, as herein stated, and for the purpose specified.

Having thus described my improvement, what I claim is—

1. A compound for mixing with starch, consisting of spermaceti, paraffine, rice-flour, stearine, and gum-arabic, with or without extract of slippery-elm, the same being made into a homogeneous mass and molded into form, as and for the purpose described.

2. A compound package consisting of starch and a glazing compound molded into form and placed in a box or package, substantially as set forth.

In testimony whereof I have hereunto set my hand this 8th day of July, A. D. 1885.

WILLIAM H. MIDGLEY.

Witnesses:

HENRY KURTZ,

JOHN KURTZ.